United States Patent [19]

Mardon et al.

[11] Patent Number: 5,735,978
[45] Date of Patent: Apr. 7, 1998

[54] SHEATHING TUBE FOR A NUCLEAR FUEL ROD

[75] Inventors: Jean-Paul Mardon, Caluire; Jean Senevat, Saint-Brevin-Les-Pins; Daniel Charquet, Albertville, all of France

[73] Assignees: Framatome; Compagnie Generale des Matieres Nuclearies; Cezus; Zircotube, all of, France

[21] Appl. No.: 730,013

[22] Filed: Oct. 11, 1996

Related U.S. Application Data

[63] Continuation of Ser. No. 347,071, Nov. 23, 1994, abandoned.

[30] Foreign Application Priority Data

Nov. 25, 1993 [FR] France ................... 93/14107

[51] Int. Cl.$^6$ ............................................. C22C 1/18
[52] U.S. Cl. .................................................. 148/672
[58] Field of Search ...................................... 148/672

[56] References Cited

U.S. PATENT DOCUMENTS 4,584,030  4/1986  McDonald et al. ................. 148/672

FOREIGN PATENT DOCUMENTS 0196286  10/1986  European Pat. Off. ........... 148/672
0446924   9/1991  European Pat. Off. ........... 148/672
6-49608   2/1994  Japan ............................... 148/672

*Primary Examiner*—John Sheehan
*Attorney, Agent, or Firm*—Pollock, Vande Sande & Priddy

[57] ABSTRACT

A method of manufacturing a tube suitable for use as sheath of a nuclear fuel rod zirconium based alloy. The alloy contains 0.18% to 0.25% iron, 0.07% to 0.13% chromium, 0.35% to 1.70% tin, all percentages by weight, 900 ppm to 2300 ppm oxygen, 80 ppm to 200 ppm carbon, and 50 ppm to 120 ppm silicon. A drawn blank is subjected to successive passes of metallurgical treatment and of heat treatment. The Fe/Cr ratio by weight in the alloy lies in the range 1.6 to 3. The heat treatment includes, after at least one rolling pass, a plurality of annealing passes under an inert atmosphere such that the sum $\Sigma A$ is greater than $1.5 \cdot 10^{-17}$, and advantageously in the range $2 \cdot 10^{-17}$ to $2 \cdot 10^{-16}$. The first rolling pass is performed on the tube coming from the drawing operation, without an intermediate annealing. $\Sigma A$ designates the sum of the products of the times $\underline{t}$ (in hours) multiplied by the exponential of $-Q/RT$, where $\overline{T}$ is the temperature in K.

13 Claims, No Drawings

SHEATHING TUBE FOR A NUCLEAR FUEL ROD

This application is a File Wrapper Continuation of U.S. patent application Ser. No. 08/347,071, filed Nov. 23, 1994 now abandoned.

BACKGROUND OF THE INVENTION

The present invention relates to methods of manufacturing a zirconium alloy tube intended to constitute the sheath of a nuclear fuel rod. A major, but not exclusive application thereof lies in the field of manufacturing sheathing tubes for fuel rods designed for use in pressurized water nuclear reactors.

Until now, use has been made above all of sheaths made of a zirconium based alloy known as "Zircaloy 4", which essentially contains the following, by weight:

1.20% to 1.70% tin, 0.18% to 0.24% iron, 0.07% to 0.13% chromium, with the total content of iron and chromium lying in the range 0.28% to 0.37%. Usually, the ratio between the iron content and the chromium content lies in the range from about 1.38 to about 3.42.

The mechanical strength of "Zircaloy 4" sheaths has turned out to be satisfactory. On the other hand, corrosion by high temperature pressurized water puts a limit on the length of time they can be allowed to remain in a reactor.

Consequently, proposals have already been made for sheathing tubes that comprise an inner layer of "Zircaloy 4" and an outer layer made of a zirconium based alloy having a reduced tin content, but compensated by a high oxygen content, lying in the range 1900 ppm to 2300 ppm (EP-A-0 552 098). Such tubes give satisfactory results provided that the sheath is in a metallurgically relaxed state, but they are more complex to manufacture than tubes of uniform composition.

Finally, proposals have been made (EP-A-0 196 286) for a method of manufacturing sheathing tubes of a zirconium based alloy containing 1% to 5% by weight of alloying elements such as Sn, Fe, Cr and Ni, in which a tube-blank as drawn is annealed prior to being subjected to α-phase cold rolling operations optionally interspaced with annealing operations, such that the sum ΣA is greater than $2.3.10^{-4}$, account being taken of the contribution of the annealing after drawing.

The term ΣA designates the sum, over all of the annealing operations, of the products of the times $t$ (in hours) multiplied by exp-(—Q/RT) where T is temperature in K.

When calculating ΣA, the cited document starts from the assumption that Q is about 65,000 cal/mole.

SUMMARY OF THE INVENTION

An object of the present invention is to provide an improved method of manufacturing a zirconium alloy sheathing tube.

A more particular object is to provide a method which reconciles a high degree of resistance to generalized corrosion in an aqueous medium at high temperature, satisfactory thermal creep behavior, and good resistance to corrosion under stress.

To this end, there is provided a method of manufacturing a tube for sheathing a nuclear fuel rod out of an alloy based on zirconium and also containing 0.18% to 0.25% by weight of iron, 0.07% to 0.13% by weight of chromium, 0.35% to 1.70% by weight of tin, 900 ppm to 2300 ppm oxygen, 80 ppm to 200 ppm carbon, and 50 ppm to 120 ppm silicon. The method comprises a plurality of successive passes of metallurgical treatment and of heat treatment applied to a blank obtained by drawing, the ratio by weight between the iron and the chromium in the alloy being in the range 1.6 to 3, and in the heat treatment including, after at least one rolling pass, a plurality of annealing passes under an inert atmosphere, such that the sum ΣA is greater than $1.5.10^{-7}$, and advantageously lies in the range $2.10^{-7}$ to $2.10^{-16}$. The first rolling pass is performed on the tube coming from the drawing operation, without intermediate annealing.

In the alloys under consideration, Q/R (the ratio of activation energy Q to the gas constant R, close to 2) is about 40 000 $K^{-1}$.

Under such conditions, the above thermal treatments serve to obtain an appropriate size of precipitates and to put phases into equilibrium, with a final annealing pass advantageously being performed at a temperature in the range 450° C. (advantageously 470° C.) and 500° C., so as to distribute the iron judiciously between the various precipitates $Zr(Cr/Fe)_2$—$Zr_2FeSi$—$Zr_2FeNi$—$Zr_2Fe$ and $Zr_3Fe$ so as to obtain a ratio of Fe/Cr in the $Zr(Cr/Fe)_2$ in the range 2.2 to 2.6, which ratio may be obtained with a weight ratio between the iron and the chromium in the alloy of up to 3.

The upper limit of 3 on the ratio Fe/Cr is the limit beyond which creep increases and resistance to corrosion under stress is significantly degraded. A ratio of less than 1.6 gives rise to a high degree of dispersion in corrosion resistance for a single composition.

The range 1.6 to 3 has been found to be particularly advantageous because the dispersion of results (with respect to generalized corrosion resistance) is relatively small around a mean, and resistance to corrosion is particularly high. Corrosion is at a minimum for a ratio of about 2.4 (with the exact ratio depending on the quenching speed that is adopted), and it increases only slowly above 2.4. In practice, the best compromise (low corrosion, optimum nature and size of precipitates, good resistance to creep) corresponds to a ratio Fe/Cr lying in the range 2.2. to 2.6.

In general, the complete manufacturing sequence starting from an ingot of alloy may comprise:

a forging operation to make up rounds or bars, e.g., having a diameter of 180 mm for final tubes having a diameter of 9.5 mm;

quenching in the β-phase;

internal machining, e.g. to a diameter of 70 mm;

quenching in the β-phase followed by annealing;

drawing while hot to obtain an α-phase tube-blank; and a thermodynamic sequence constituted by rolling passes with intermediate annealing passes.

The product (a tubular blank obtained by drawing, of a thickness Greater than a final thickness) is referred to as "trex". It is subjected to the successive sequences of rolling and of annealing.

The "round" or bar is obtained by successive melting and solidifying stages followed by hot deformation; it is subjected to quenching, optionally followed by annealing. For the above-defined Fe/Cr contents, quenching at a rate in the range of 5° C. per second to 30° C. per second from a temperature of more than 1000° C. gives precipitates of a nature and a size that finally contribute to obtaining high resistance to Generalized corrosion. This intermediate size is advantageously such as to give rise, after a full sequence of treatments, to a final precipitate size of greater than 0.18 μ, which has been found to be particularly favorable.

A possible explanation for the unfavorable effect on creep of an Fe/Cr ratio higher than that defined herein (the exactness of this hypothesis should be considered as being of no influence on the validity of the patent) is that increasing the Fe/Cr ratio increases the size of $Zr(Fe,Cr)_2$ precipitates excessively and modifies the nature of the phases by giving rise to the appearance of the precipitated phase $Zr_2Fe$, inter alia. As to the presence of a minimum in the rate of generalized corrosion, it is probably associated with competition between a plurality of mechanisms for forming precipitated phases.

It also appears that the Fe/Cr ratio in the above range has no effect on the fraction of hydrogen absorbed in an aqueous medium at high temperature.

The favorable results obtained by the invention depend not only on an appropriate choice of the Fe/Cr ratio, but also on the use of an appropriate sequence of metallurgical and thermal treatments terminated by annealing that gives rise to a tube in the relaxed state. This annealing may comprise mantaining the tube in the range 470° C. to 500° C. for at least four hours.

The sequence may comprise some or all of the following metallurgical and thermal steps:

initially, a bar is made by successive melting and solidifying of an ingot under a vacuum, and then by forging with final quenching in the $\beta$ domain, at a rate of cooling in the range 5° C. to 30° C. per second starting from a temperature greater than 1000° C. and going down to about 800° C.;

after $\beta$ quenching, the bar is brought to $\alpha$-phase by annealing to a temperature lying in the range 700° C. to 750° C., and advantageously about five 715° C., for a period in the range four to six hours, and advantageously about five hours;

drawing in the form of a blank in $\alpha$-phase;

at least one cold rolling sequence, without prior annealing, followed by annealing in the range 700° C. to 750° C. (generally in the range 720°–740° C., and advantageously at about 730° C.) for a period of three hours;

successive rolling operations in the form of tubes of decreasing thickness with intermediate annealing operations under argon at a temperature in the range 640° C. to 740° C., and advantageously about 700° C.; and final relaxation annealing in the range 470° C. to 500° C., still under an inert atmosphere, generally of argon, with the tube remaining in the $\alpha$-phase.

The tube made in this way is subjected to no further thermal treatments modifying its metallurgical structure. By contrast, it continues to receive surface treatments, and it is subjected to examination prior to being used as a sheath.

The surface treatment may include sanding and chemical cleaning by means of an $HF-HNO_3$ mixture, followed by washings. It is thereafter polished using a moving strip or a wheel. Checking may be performed conventionally using ultrasound, eddy currents and/or visually.

Among the above-defined alloy compositions, some have been found to be particularly advantageous. In particular, a composition may be adopted in which the contents of tin, iron, and chromium comply with those corresponding to the definition of "Zircaloy 4", as given above, with 0.05% to 0.10% chromium, and with a Fe/Cr ratio in the range 1.9 to 2.5, together with 50 ppm to 120 ppm of silicon and 80 ppm to 200 ppm of carbon.

Another composition that is particularly advantageous for making sheathing tubes designed for pressurized water reactors may be referred to as an "oxygen-doped low-tin composition". It contains 0.18% to 0.25% iron, 0.075% to 0.10% chromium, 0.45% to 0.75% tin, 50 ppm to 120 ppm silicon, 80 ppm to 200 ppm carbon, and 1900 ppm to 2300 ppm oxygen.

The tubes obtained in this way have high resistance to various types of corrosion, included in the presence of iodene.

DETAILED DESCRIPTION

By way of example, there now follows a description of a usable manufacturing range.

The starting alloy may be in the form of an ingot. By successive melting and solidification operations under a vacuum, e.g., three such operations, it is implemented in the form of a bar which is quenched in water at a speed which is controlled to bring it into the $\beta$ domain, with its cooling speed in the range 5° C. per second to 30° C. per second from at least 1000° C. to at least about 800° C. All of the annealing performed after quenching takes place at a temperature of less than 800° C. so as to remain in the $\alpha$-phase, and avoiding penetrating into the two-phase domain. The bar is then annealed at about 715° C. per four and a half hours in order to increase the size of the precipitates. The bar is then drawn, advantageously at a temperature of about 650° C. using a standard process in order to obtain a blank. The blank may optionally be subjected to annealing at around 730° C. and is subsequently subjected to two passes of cold rolling, with each rolling pass being followed by annealing at a temperature of around 730° C. in order to ensure an appropriate value of $\Sigma A$.

The resulting trex is subjected to a plurality of successive rolling passes bringing the tube progressively to its final size. Each rolling pass is followed by annealing under an inert atmosphere, generally under argon. The intermediate annealing passes are advantageously performed at about 700° C., while the final relaxation annealing pass is generally performed in the range 470° C. to 500° C.

We claim:

1. A method of manufacturing a tube for sheathing a nuclear fuel rod, comprising the steps of:

(a) drawing a tube blank of zirconium based alloy containing 0.18% to 0.25% by weight of iron, 0.07% to 0.13% by weight of chromium, and 0.35% to 1.70% by weight of tin, 900 ppm to 2300 ppm oxygen, 80 ppm to 200 ppm carbon, and 50 ppm to 120 ppm silicon, the ratio by weight between iron and chromium in the alloy being in the range 1.6 to 3;

(b) carrying out a plurality of successive passes of metallurgical treatment;

(c) carrying out a heat treatment on said tube blank following each of said passes, said heat treatment including after at least one rolling pass performed on said tube blank obtained by drawing, without intermediate annealing, a plurality of annealing passes under an inert atmosphere such that a sum $\Sigma A$ is greater than $1.5 \cdot 10^{-17}$.

2. The method according to claim 1 wherein said sum $\Sigma A$ is of from $2 \cdot 10^{-17}$ to $2 \cdot 10^{-16}$.

3. The method according to claim 1, wherein a last one of said annealing passes is carried out at a temperature of from 450° C. to 500° C. for a time such that the alloy is predominantly in $\alpha$-phase.

4. The method according to claim 1, wherein said heat treatment comprises, after rolling a trex into said blank tube, at least one annealing step in an inert atmosphere at a temperature of from 640° C. to 740° C.

5. The method according to claim 4, wherein said trex is obtained by drawing a bar of said alloy in α-phase as a tubular blank and by at least one sequence consisting of cold rolling and annealing at a temperature of from 700° C. to 750° C. for one to three hours.

6. The method according to claim 5, further comprising a preliminary step of bringing said bar into α-phase by annealing said bar initially in the β-phase at a temperature of from 680° C. to 750° C. for four to six hours.

7. The method according to claim 6 wherein said bar is first brought to the β-phase by quenching at an initial cooling speed of from 5° C./sec. and 30° C./sec. from a temperature higher than 1000° C., until the temperature is about 800° C.

8. The method according to claim 1, wherein the Fe/Cr ratio is comprised between 2.2 and 2.6.

9. The method according to claim 1, wherein the alloy comprises from 1.20% to 1.70% tin, 0.18% to 0.24% iron and 0.075% to 0.10% chromium, the total amount of iron and chromium being in the range of 0.28% to 0.37%, and 50 ppm to 120 ppm silicon and 80 ppm to 200 ppm carbon, the balance being zirconium except for unavoidable impurities.

10. The method according to claim 1, wherein the alloy contains 0.18% to 0.25% iron, 0.075% to 0.10% chromium, 0.45% to 0.75% tin, 50 ppm to 120 ppm silicon, 80 ppm to 200 ppm carbon, and 1900 ppm to 2300 ppm oxygen, the balance being zirconium except for unavoidable impurities.

11. A method of manufacturing a tube for sheathing a nuclear fuel rod, comprising the steps of:

(a) preparing a tube blank of zirconium based alloy in α-phase, containing, by weight, 0.18% to 0.25% iron, 0.07% to 0.13% chromium, 0.35% to 1.70% tin, all percentages by weight, 900 ppm to 2300 ppm oxygen, 80 ppm to 200 ppm carbon, and 50 ppm to 120 ppm silicon, the ratio by weight between iron and chromium in the alloy being in the range 1.6 to 3; and (b) carrying out a plurality of successive passes each of metallurgical treatment and of annealing under an inert atmosphere on said tube blank, the first metallurgical treatment including at least one rolling pass performed on the blank tube as obtained by drawing, without intermediate annealing, and the plurality of annealing passes being such that a sum $\Sigma A = t.\exp.(-40,000/T)$, where t designates annealing time in hours, T designates temperatures in K at which said annealing is performed and R is the general gas constant, is comprised between $2.10^{-17}$ and $2.10^{-16}$, a last annealing being carried out at a temperature between 450° C. and 500° C. and a resulting tube blank being used without further heat treatment.

12. The method according to claim 1, wherein a last one of said annealing passes is in the range of 470° C. to 500° C., under an inert atmosphere.

13. The method according to claim 1, wherein said annealing passes are carried out between said metallurgical treatments consisting of rolling operations and are in the range 700° C. to 750° C. for about three hours.

* * * * *

UNITED STATES PATENT AND TRADEMARK OFFICE
CERTIFICATE OF CORRECTION

PATENT NO. : 5,735,978
DATED : April 7, 1998
INVENTOR(S) : Jean-Paul MARDON, et al.

It is certified that error appears in the above-indentified patent and that said Letters Patent is hereby corrected as shown below:

```
On the title page item
  [73] Change "Nuclearies" to --Nucléaires--.
```

Signed and Sealed this

Eighteenth Day of August, 1998

Attest:

BRUCE LEHMAN

*Attesting Officer*      *Commissioner of Patents and Trademarks*